Dec. 1, 1964

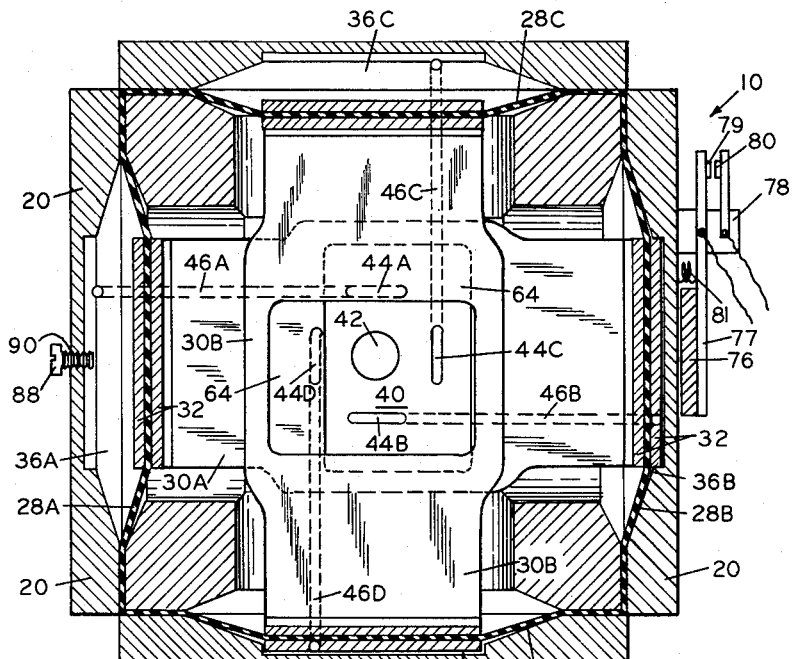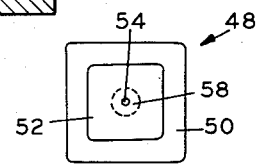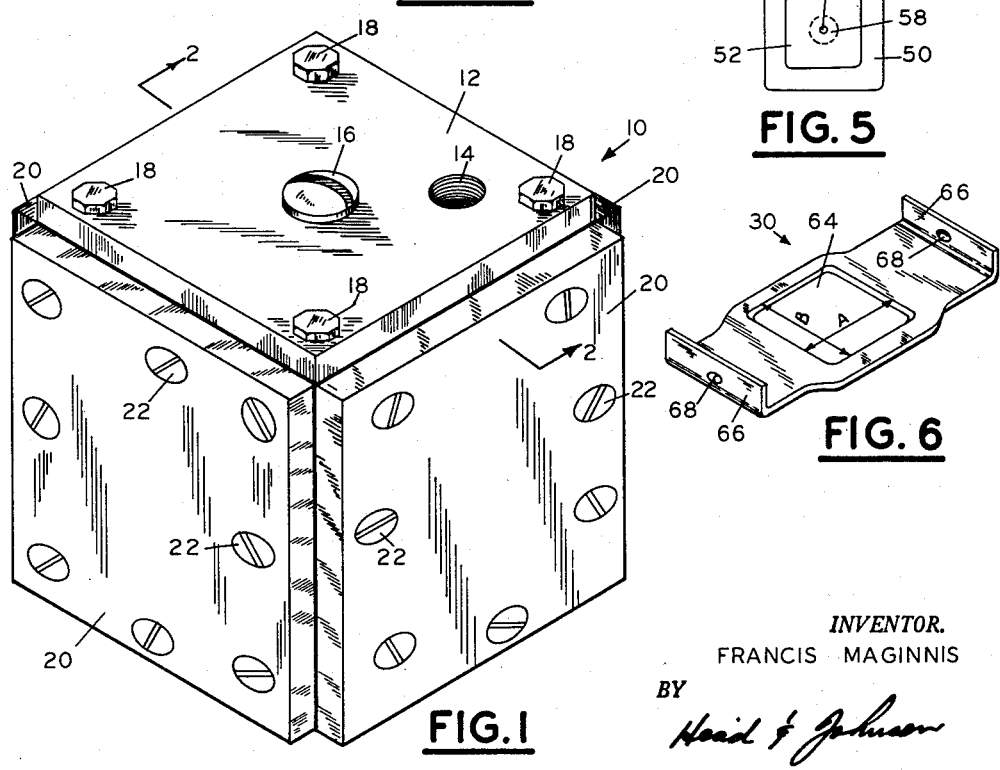

F. MAGINNIS 3,159,030

FLUID METERS

Filed March 14, 1961

INVENTOR.
FRANCIS MAGINNIS
BY
*Head & Johnson*
ATTORNEYS

INVENTOR.
FRANCIS MAGINNIS
BY
*Head & Johnson*
ATTORNEYS

United States Patent Office 3,159,030
Patented Dec. 1, 1964

3,159,030
FLUID METERS
Francis Maginnis, Norman, Okla., assignor to
A. O. Smith Corporation
Filed Mar. 14, 1961, Ser. No. 95,548
5 Claims. (Cl. 73—247)

This invention relates to a fluid meter. More particularly the invention relates to a multi-chamber fluid meter including means whereby a high degree of accuracy may be maintained within a wide range of fluid volume flows and wherein wearing of the components does not lessen the accuracy of the meter.

There are many types of meters available. Some types of meters have a fairly limited range of accuracy, that is, they are accurate only within a limited range of fluid flow. Such meters provide fairly accurate measurements at high volumes but loes their accuracy at low rates of fluid flow, in fact, some meters which measure accurately at high volumes show neasurement of low rates of fluid flow. Other types of flow meters measure accurately over a wider range of fluid flow rates, but lose accuracy as the meter components wear due to loosening of linkages and connection components.

Within recent years increased requirements for high accuracy fluid measurements have developed. As an example, in order to determine gasoline consumption the most accurate method requires the measurement of gasoline flow between the gas tank of a vehicle to the carburetor. When the vehicle is idling the gas flow is very small compared to the gas consumption under accelerating or fast driving conditions. Thus a meter is required having accuracy over a wide range of fluid flow rates and particularly at low flow rates, and which will not lose its accuracy by extended use.

It is therefore an object of this invention to provide a multi-chamber fluid meter which has a high degree of accuracy and has characteristics such that the accuracy of the meter is maintained over a long period of time, that is, the accuracy is not impaired as the parts of the meter wear.

Another object of this invention is to provide a multi-chamber fluid meter which will have improved accuracy under a wide range of fluid flows.

Another object of this invention is to provide a fluid meter having means incorporated therein whereby each of a multiplicity of chambers is completely filled on each stroke of the meter whereby greatly improved accuracy is obtained.

Another object of this invention is to provide a four cylinder radial expansionable chamber meter including means whereby each chamber is completely filled on each stroke of the meter elements by a method of extracting a small amount of energy from the fluid flow as the chamber begins to expand and returning the energy to the stream on the final stages of the expansion of the chamber.

Another object of this invention is to provide a fluid flow meter having greatly improved accuracy at low fluid flow rates and a meter which suffers no loss of accuracy with use wherein the meter is inexpensive to manufacture and assemble, utilizes a minimum of components, and eliminates substantially all linkages, and is therefore substantially free of the possibility of failure.

These and other objects and a better understanding of the invention may be had by referring to the following description and claims taken in conjunction with the attached drawings in which:

FIGURE 1 is an external view of a fluid meter constructed according to the principles of this invention.

FIGURE 4 is a cross-sectional view taken along the line 4—4 of FIGURE 2 showing the position of the meter yokes relative to each other and the configuration of the port plate.

FIGURE 5 is a view of the bottom surface of the inverted cup-slide member.

FIGURE 6 is an isometric view of a yoke member—two of which are used in the meter of this invention.

Figure 2:
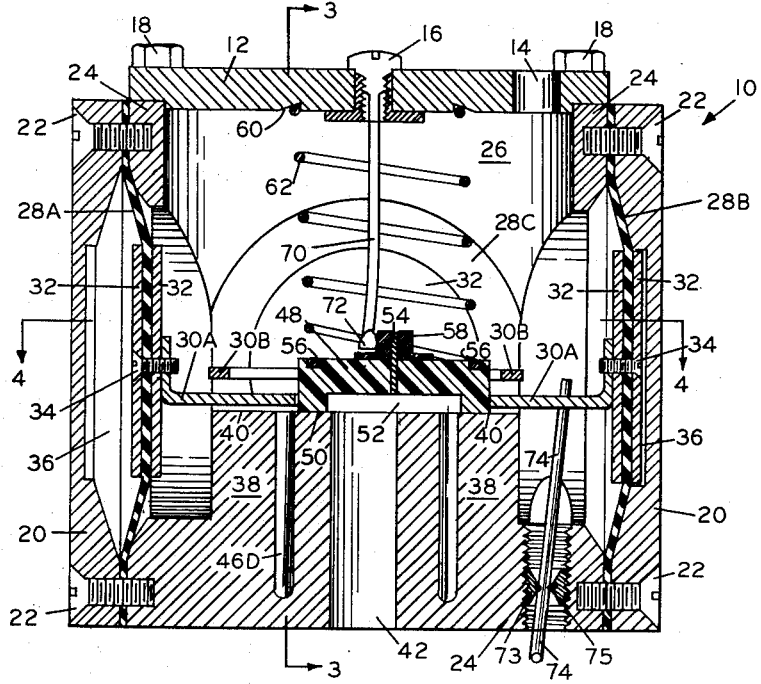
FIGURE 2 is a cross-sectional vew taken along the line 2—2 of FIGURE 1 showing the internal construction of the invention.

This invention may be generally described as a full stroking multi-chamber fluid flow meter. More particularly, but not by way of limitation, the invention may be described as a fluid meter comprising, in combination; a body member having a fluid cavity therein adaptable to receive fluid into said meter; a first and a second pair of radially disposed expansionable chambers supported to said body member; expansionable chamber members actuated within said expansionable chambers whereby the volume of each of said expansionable chambers may be varied; a first yoke member extending from one of said expansionable chamber members of said first pair to the other of said expansionable chamber members of said first pair; a second yoke member extending from one of said expansionable chamber members of said second pair to the other of said expansionable chamber members of said second pair, said yoke members disposed to reciprocate by action of said pairs of expansionable chamber members perpendicular to each other in parallel planes and in near proximity to each other, and each of said yoke members having a rectangular opening therein, the opening in said first yoke member overlapping said opening in said second yoke member; a port plate positioned in a plane parallel to said yokes and in near proximity thereto, said port plate having a discharge opening therein communicating with the exterior of said body member and four fluid control openings therein each having passage continuity with one of said expansionable chambers; a inverted cup-slide member adaptable to slideably engage on the bottom surface thereof said port plate, said inverted cup-slide member extending through said overlapping openings in said yoke members and adaptable thereby to be movably positioned on said port plate by movement of said yoke members, said inverted cup-slide having a fluid cavity formed in the bottom surface thereof adaptable to permit fluid to flow from said fluid control openings into said discharge opening according to the position of said inverted cup-slide member; means of full reciprocal stroking said yoke members, said means functioning to extract energy from the flow of fluid through said meter on the first portion of the reciprocal movement of each of said yoke members and returning said energy to the flow of fluid through said meter on the last portion of the reciprocal movement of each of said yoke members whereby each reciprocal movement of each of said yoke members increases one of said expansionable chambers to the maximum volume thereof and decreases the other of said expansionable chambers to the minimum volume thereof; and means of detecting the number of reciprocal movements of one of said yoke members, said number of reciprocal movements being indicative of the volume of fluid flow through said meter.

Referring now to the drawings and first to FIGURE 1, the meter of this invention is indicated generally by the numeral 10. The meter 10 is shown as constructed in the general external physical shape of a cube. This is by way of example only, showing the simplicity of the meter. Virtually any other configuration will serve satisfactorily as dictated by the specific requirements for which the principles of this invention are utilized in designing meters for a multitude of applications. In the simplified construction of this invention of FIGURE 1 a top plate 12 is provided having a fluid intake 14 by which fluid enters the meter 10. A similar fluid outlet (not shown) in the bottom of meter 10 conducts fluid away from the meter. A shaft anchor 16, the function of which will be described in more detail subsequently, is positioned in top plate 12. Top plate 12 is supported to a body member (not visible in FIGURE 1) by bolts 18. Four diaphragm plates 20 are supported to the side of the body member by screws 22.

Referring now to FIGURE 2 the internal configuration of the meter of this invention is best disclosed. A body member 24 is machined or cast to provide, in the upper half thereof, a fluid chamber 26. Fluid enters the meter 10 through fluid opening 14 in top plate 12 to fill fluid chamber 26.

Four diaphragms 28A, 28B, 28C and 28D are utilized in the meter and are positioned each in a vertical plane and spaced 90° with respect to each other. Diaphragms 28A and 28B are shown in cross-section in FIGURE 2 and the back side of diaphragm 28C is shown. No portion of diaphragm 28D is shown in FIGURE 2. The four diaphragms 28 operate in pairs and each pair is connected together by a yoke 30. Diaphragms 28A and 28B are connected together by a yoke 30A while diaphragms 28C and 28D are connected together by a yoke 30B. Flexing of the diaphragms 28 results in yokes 30A and 30B being reciprocated in parallel planes and at 90° with each other. Yokes 30 are affixed to diaphragms 28 by pairs of metal backing plates 32 and screws 34.

Formed in each diaphragm plate 20 is a dish-shaped diaphragm cavity 36 of a configuration so that when the diaphragm 28 is forced toward a diaphragm plate 20 the diaphragm cavity 36 is substantially reduced to a volume of zero, or in practice, a very minimum volume. Body member 24 is of a configuration such that when each diaphragm cavity 36 is fully expanded to maximum volume each diaphragm 28 firmly engages the body member 24. In this manner, there is no expansion of the diaphragms 28 under high pressure either in the fully opened or fully closed condition so that the same volume of fluid is required to fill diaphragm cavities 36 regardless of the pressure of the fluid. When a diaphragm 28 is moved away from its corresponding diaphragm plate 20, a larger diaphragm cavity 36 is created. Metering is accomplished in meter 10 by the filling and emptying of diaphragm cavities 36.

Integrally formed in body member 24 is a port plate portion 38. The upper flat surface of port plate portion 38 forms port plate 40. Port plate 40 is provided with five port openings. These port openings are best seen in FIGURE 4. In the center of the port plate 40 is discharge opening 42. Four fluid ports, or fluid control openings, 44A, 44B, 44C and 44D, are provided in a spaced arrangement around the discharge opening 42. The four fluid openings 44A through 44D connect through fluid cavities 46A, 46B, 46C and 46D with diaphragm cavities 36A through 36D. In FIGURE 4 the yokes 30A and 30B are shown but the inverted cup-slide and other elements above the inverted cup-slide, which will be described in detail subsequently, are not shown. Ports 44A and 44D are below the yokes 30A and 30B and therefore are shown dotted.

FIGURE 2 shows that yokes 30A and 30B are in spaced parallel planes above and parallel to the plane of port plate 40 so that fluid which enters fluid chamber 26 is not interrupted in its flow through ports 44A through 44D in any way by the presence of the yokes 30.

Port plate 40 is shown as the upper surface of port plate portion 38 and is thus integrally formed of body member 24. It can be seen that port plate 40 could be constructed of a flat thin plate with fluid cavities 46A through 46D and discharge opening 42 replaced by tubing members rather than as openings in body member 24.

Returning now to FIGURE 2 the discharge opening 42 is shown extending from port plate 40 to the bottom of the port plate portion 38 of body member 24 where it discharges exterior of the meter 10. Threads (not shown) may be provided in the discharge opening 42 to receive pipe connections whereby fluid is conducted away from the meter.

An inverted cup-slide member 48 is positioned to engage port plate 40. Port plate 40 is a smooth flat surface which matches the lower surface 50 of inverted cup-slide 48. These flat matching surfaces of port plate 40 and inverted cup-slide 48 are the only precision fit requirements of the meter according to the novel principles of this invention to achieve accurate metering.

The construction of the bottom surface 50 of the inverted cup-slide 48 is best shown in FIGURE 5. Formed in the bottom of the inverted cup-slide 48 is a fluid cavity 52. In FIGURE 2 the inverted cup-slide 48 is shown in cross-section disclosing fluid cavity 52. In the center of the inverted cup-slide 48 a pin 54 is positioned extending perpendicularly from the upper surface. Pin 54 is manufactured of a metal such as brass or stainless steel. A circular spring groove 56 is also provided in the upper surface of the inverted cup-slide 48. A positioner bearing 58 having a hole through the center to receive pin 54 is positioned on the inverted cup-slide to provide a bearing surface for purposes which will be described in detail subsequently.

Inverted cup-slide 48 is best composed of an inert plastic material such as "Teflon" or "nylon," with "Teflon" being preferred because of its resistance to wear and its low coefficient of friction as it slides on port plate 40. Positioner bearing 58 is likewise manufactured of a wear resistant plastic material with "nylon" being preferred. These materials are listed by way of example only, and the device of course may be manufactured of a multitude of various materials.

Extending from a spring groove 60 in the underside of top plate 12 to spring groove 56 in inverted cup-slide 48 is a coiled compression spring 62. The function of spring 62 is to maintain inverted cup-slide 48 in contact with port plate 40.

Each of the yokes 30, best shown in FIGURE 6, has an opening 64 therein. The opening 64 is such that width A is barely wider than the width of the square shaped inverted cup-side 48. Width B is approximately one-third longer than inverted cup-slide 48 so that opening 64 is rectangular. The inverted cup-slide 48 is thus slideable back and forth in the direction of length B of opening 64 of each of the yokes 30. Yokes 30 have at each end thereof integrally formed angular portions 66 with a threaded opening 68 therein to receive screws 34 whereby the yokes 30 are supported at each end of a diaphragm 28. One of the yokes 30A is affixed to diaphragm 28A and 28B having the angular portions 66 turned upward and the other yoke 30B is affixed to diaphragms 28C and 28D having angular portions 66 turned downward. The yoke members 30A and 30B operate in planes parallel to each other but displaced from each other to provide free passages of fluid there-between and also free passage of fluid between the lower yoke member 30A and the port plate 40. As is shown in FIGURE 4, the yoke 30A and 30B are positioned at right angles to each other and are reciprocated by diaphragms 28 in directions at a right angle to each other, forming what may be termed a crossed scotch yoke arrangement. The overlapping openings 64 in yoke members 30A and 30B always leaves an opening slightly larger than the size of inverted cup-slide 48. The position of inverted cup-slide 48 on the port plate 40 is thus a function of the position of both yoke members 30A and 30B.

Affixed to upper plate 12 by shaft anchor 16 is a shaft 70 having a ball member 72 on the end thereof adaptable to engage positioning bearing 58. Shaft 70 is of a flexible metal which is adaptable to flex within its deformable limits by the action of inverted cup-slide 48. The provision of shaft 70 and its action on inverted cup-slide 48 is an important element of this invention and will be described in greater detail subsequently.

Spring 62 may be eliminated by proper design yokes 30 and inverted cup-slide 48. It will be noted that as yoke 30A starts to move inverted cup-slide 48 against the spring tension of shaft 70 exerting force against positioning bearing 58, a movement is created tending to tilt inverted cup-slide 48 from complete engagement with port plate 50. This tendency is counteracted by the hydrostatic force of fluid within cavity 26 applied against inverted cup-slide 48. By designing inverted cup-slide 48 and yokes 30 to reduce the movement to a force inferior to the hydrostatic force on inverted cup-slide 48 it is possible to eliminate the requirement of spring 62. For most applications the use of spring 62 is deemed preferable.

Operation

Fluid enters the meter 10 through fluid intake 14 to fill fluid chamber 26. In order to leave the meter the fluid must ultimately pass through discharge chamber 42. Inverted cup-slide 48 always completely covers discharge chamber 42 so there is no way for the fluid to pass through the meter 10 without entering the fluid cavity 52 of the inverted cup-slide through the ports 40A through 40D.

Refer now to FIGURE 4. As has been previously mentioned inverted cup-slide 48 is not shown but it will always occupy the square opening formed by the overlapping openings 64 of yoke members 30A and 30B. Occupying this overlapped opening means that fluid pressure from within cavity 26 can cause fluid to flow in only ports 44A and 44D since ports 40B and 40C are covered by the inverted cup-slide. With the meter 10 in the attitude shown in FIGURE 4 fluid will enter port 44D to fill diaphragm cavity 36D. As the diaphragm cavity 36D is filled, diaphragm 28D will force yoke 30B towards the top of the drawing moving the inverted cup-slide with it. Fluid which has previously filled diaphragm cavity 36C flows through fluid cavity 46C out fluid port 44C into fluid cavity 52 under inverted cup-slide 48 and thus out the exhaust port 42. In this manner as port 44D is open and diaphragm cavity 36D is being filled, diaphragm cavity 36C is emptied.

Yoke 30D will continue to move toward the top of the drawing moving inverted cup-slide 48 with it until port 44B is uncovered. When port 44B is uncovered, fluid may flow from fluid cavity 26 into port 44B and through fluid passages 46B to fill diaphragm cavity 36B. This will cause yoke 30A to start moving towards the left of the drawing. At this time port 44A will be under the fluid cavity 52 inverted cup-slide 48 permitting fluid cavity 36A to discharge.

The meter will continue to function in this way alternately filling and emptying each diaphragm cavity 36 in sequence as inverted cup-slide 48 is moved in a circuitous path on port plate 40 by the action of the yokes 30A and 30B. The filling and discharging of fluid from the diaphragm cavities 36 constitutes measuring of the liquid and through this process the volume of fluid flow is determined. It is only necessary to detect and register the number of reciprocal movements of either of the yoke members 30A or 30B to register the quantity of fluid flow through the meter.

One means of registering the number of strokes of the yokes 30 is indicated in FIGURE 2. A point rod 74, pivoted in an opening in body member 24, communicates the reciprocal motion of yoke member 30A to the exterior of the meter 10. The reciprocal motion of pivot rod 74 can be utilized to actuate a counter or a switch whereby the total number of reciprocal movements may be accummulated to communicate the quantity of fluid through the meter.

An externally threaded pivot member 73 pivotably supports pivot rod 74. A groove in pivot member 73 supports an O-ring 75 which engages a similar groove in pivot rod 74. The O-ring 75 seals against fluid leakage and serves as a pivot for rod 74. By positioning pivot member 73 towards or away from yoke 30A the total lateral movement of pivot rod 74 exterior of meter 10 may be adjusted to suit the type of counter device adapted for actuation by the meter 10. Some counters will require a greater degree of pivotation by pivot rod 74. If so, pivot member 73 may be threadably advanced towards yoke 30A. If a smaller degree of the movement of pivot rod 74 is required, pivot member 73 may be threadably retracted away from yoke 30A.

An additional example of a means of detecting the number of reciprocal movements of yoke 30A is indicated in FIGURE 4. Backing plates 32 may be formed of any stiff material but in this detecting application it will be assumed that at least the exterior backing plate 32 affixed to the right hand end of yoke 30A is of a paramagnetic material. It will be further assumed that the right hand diaphragm plate 20 is of a non-magnetic material, such as aluminum. A permanent magnet 76 is affixed to an arm 77 pivoted to a support 78. A movable switch contact point 79 is affixed to pivot arm 77 to engage a fixed or stationary switch contact point 80. A spring 81 holds magnet 76 away from diaphragm plate 20 and switch contact 79 open. When yoke 30A reaches the maximum movement to the right of the drawing (in the position shown in FIGURE 4) magnet 76 is attracted to backing plate 20, pivoting arm 77 and closing switch contact 79 against switch contact 80. When yoke 30A moves in the opposite direction away from magnet 76 the magnetic attraction of backing plate 32 will be overcome by the force of spring 81, pivoting arm 77 to break the continuity between switch contacts 79 and 80. The alternate making and breaking of switch contact points 79 and 80 provides electrical indication of the number of oscillations of yoke 30A and thus the quantity of fluid having passed through the meter 10. The detecting arrangement of FIGURE 4 has the advantage that no mechanical motion is transferred from the interior to the exterior of the meter 10 and therefore there is no chance of fluid leakage. Of course, the arrangement as described may be reversed with backing plate 20 formed of a permanent magnet material and magnet 76 replaced by paramagnetic material, or both backing plate 20 and magnet 76 may be of magnetic materials with poles arranged to attract when in proximity to each other. Pivot arm 77 may be replaced by a non-pivoted deflectable beam. These and many other similar arrangements will suggest themselves, all of which are within the purview of this invention.

The sequence of operation of this meter 10 is shown diagrammatically in FIGURES 7 through 12. The diaphragms 28 are shown connected to fluid passages 46 with the understanding that the diaphragm cavities are not shown. With the meter in the attitude of FIGURE 7 only port 44B is uncovered and therefore fluid will flow into port 44B and through fluid passage 46B to diaphragm 28B. This will force a yoke member, not shown in these schematic figures, to move inverted cup-slide 48 in the direction of arrow A. As inverted cup-slide 48 moves in the direction of arrow A, diaphragm 28A will discharge the fluid it has entrapped therein through fluid passage 46A out of fluid opening 44A and into discharge opening 42. For purposes of this description, it will be assumed that a very small amount of flow of fluid is passing through the meter. One of the primary novel elements of this invention includes means of providing accurate fluid measurement at very low flow rates. It will thus be necessary to first explain the action of the inverted cup-slide 48 with very low fluid flow in order to fully describe the novel means of this invention whereby the inverted cup-slide action has been corrected to insure full stroking of the meter and complete filling of the diaphragm cavities even at very low flow rates.

Figure 8:
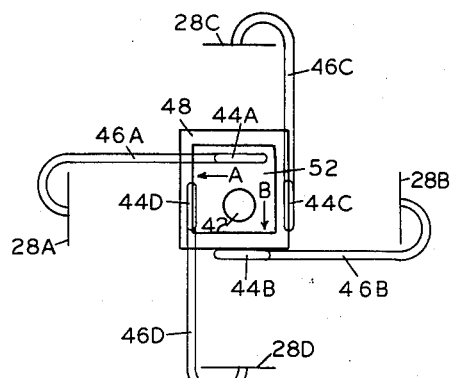

As inverted cup-slide 48 begins to move, by action of the yokes, in the direction of the arrow A, it will continue to move until approximately the position of FIGURE 8 is attained. At this position port 44C is barely opened and concurrently port 44D is within the fluid cavity of 52 of inverted cup-slide 48 providing communication with discharge opening 42. This means that fluid will start to enter port 44C and flow to diaphragm 28C, starting the movement of the inverted cup-slide 48 in the direction of arrow B. Concurrently, fluid trapped in diaphragm cavity 28D will start discharging out of port 44D. At this point the inverted cup-slide is moving in the direction both A and B.

Figure 9:
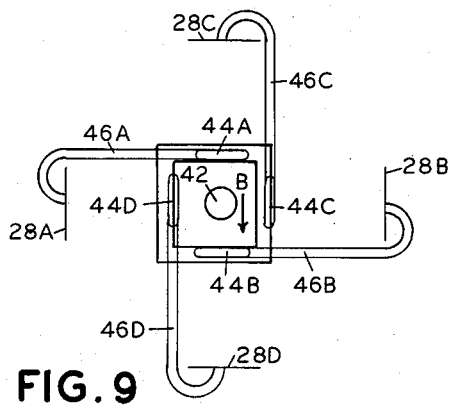
Figure 10:
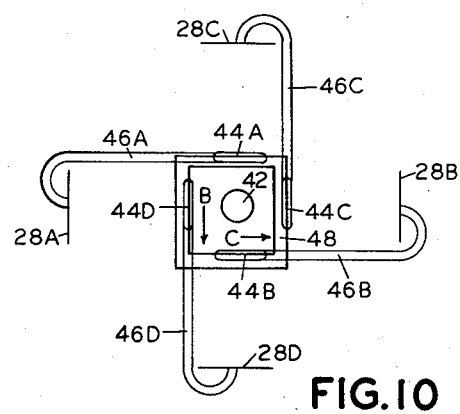
Figure 11:
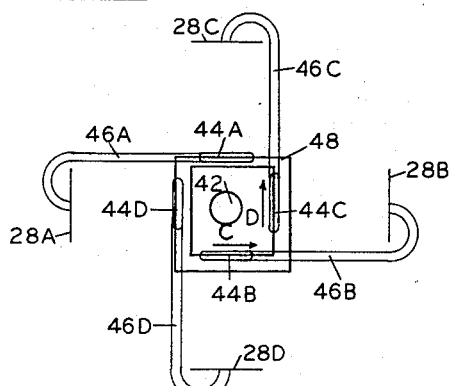

Inverted cup-slide 48 will continue to move in direction A and B until the position of FIGURE 9 is reached wherein ports 44A and 44B are both closed. Fluid is continuing to enter port 44C forcing the inverted cup-slide 48 in the direction of arrow B. Movement will continue in the direction of arrow B until the position of FIGURE 10 is reached. When this position is achieved, port 44A is barely opened allowing a small flow of fluid to diaphragm 28A so that inverted cup-slide 48 will begin to move in the direction of arrow C. Movement will continue in the direction of arrow B and arrow C until the position of FIGURE 11 is achieved wherein port 44D is uncovered to allow fluid to enter diaphragm cavity 28D and start the inverted cup-slide movement in the direction of arrow D. Movement in this direction will continue until port 44B is barely opened starting a movement again in direction A. Thus, the inverted cup-slide 48 has taken a relatively circuitous path allowing each of the diaphragms 28 to fill and discharge.

The problem exists however in that the inverted cup-slide 48 under very small rates of flow moves only sufficiently to barely allow each port 44 to open and moves to open the next port 44 before the diaphragm cavities 36 are completely filled. At high rates of fluid flow the inertia required to open a port 44 will move the yoke members at a velocity sufficient to insure that on each stroke each diaphragm cavity is completely filled and its mating diaphragm cavity completely discharged. The problem overcome by this invention however is to insure that each diaphragm cavity is completely filled even at very low stroke rates. This is achieved by the novel means, in one embodiment of the invention, by the provision of shaft 70, shown in FIGURE 2.

Figure 12:
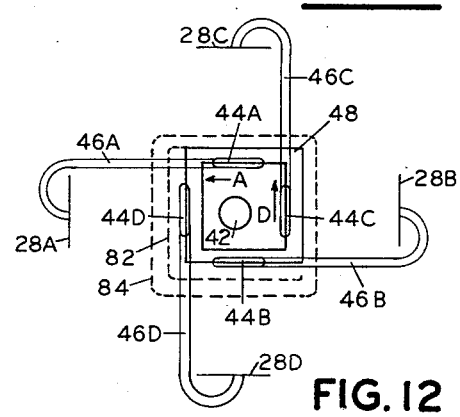

Referring to FIGURE 12, the total area transversed by the inverted cup-slide 48 at minimum rates of flow wherein the diaphragm cavities are not completely filled before the next stroke begins is indicated by the area outlined by dotted line 82, whereas the area the inverted cup-slide 48 will cover when full stroking and complete filling of the diaphragm cavities is achieved is outlined by the dotted line 84. It can be seen that a great inaccuracy in the measurement of the meter occurs when the diaphragm cavities 36 are not completely filled or, other words, when the stroke lengths of the yokes 30 are not the same for both high and low rates of fluid flow. This error may be corrected according to the principles of this invention by the provision of shaft 70, best seen in FIGURE 2. Shaft 70 is a spring material member extending perpendicularly from shaft anchor 16 in top plate 12. A ball 72 affixed to shaft 70, is adapted to engage positioning bearing 58 on inverted cup-slide 48 as a port 44 opens to move one of the yokes 30. Movement of the inverted cup-slide 48 will not occur without deflecting shaft 70 on the first half of the total motion of a yoke member 30 from one extreme position to another. As a yoke member 30 is moved from one position to another, energy is extracted during the first half of the total movement from the flow of the fluid by deflection of the shaft member 70. As the inverted cup-slide 48 continues to move by the movement of a yoke member 30 through the second half of its total movement from one extreme postion to the other, the energy stored in the deflected shaft 70 is returned as the yoke member 30 and the inverted cup-slide is forced to move its full distance in the opposite direction. By the novel provisions of this arrangement, small quantities of energy are repeatedly extracted from the fluid flow and immediately returned to the fluid flow to insure full stroking of the meter.

The effect of shaft 70 is such that energy is required to deflect the shaft to move the inverted cup-slide one-half of its direction. After having moved this one-half of its total movement in any one direction by the effect of a yoke member 30, the deflected shaft 70 forces the inverted cup-slide and therefore the yoke member 30 to move its full stroke length during the last half of the total movement. In this manner, the deflection of shaft 70 assures that each stroke of the meter will fully fill each diaphragm cavity 36 and fully empty it on the discharge stroke. Thus, regardless of how small the fluid flow through the meter, the diaphragm cavities 36 always completely fill and completely empty so that the accuracy of the meter remains constant over a wide range of fluid flows and particularly at very small rates of fluid flow.

Figure 3:
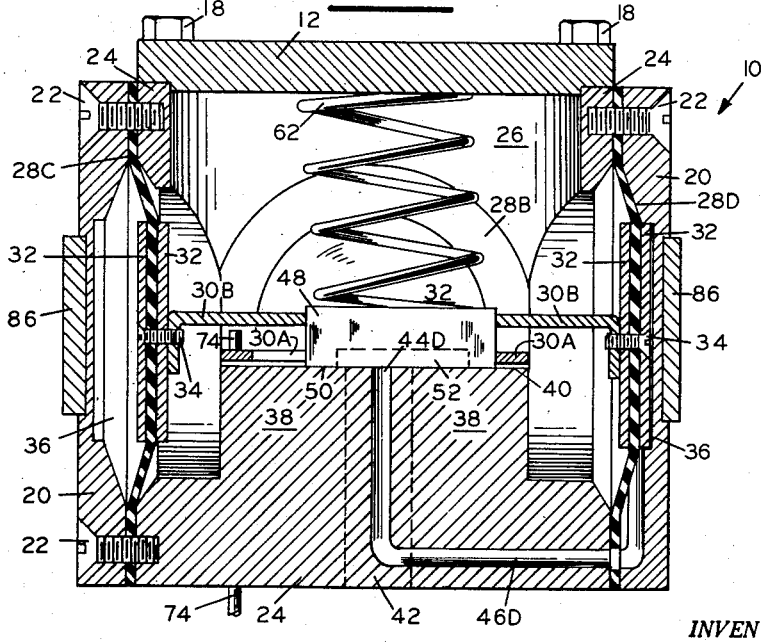
FIGURE 3 is a cross-sectional view taken along the line 3—3 of FIGURE 2 showing more details of the internal construction of the fluid meter of this invention.
Figure 7:
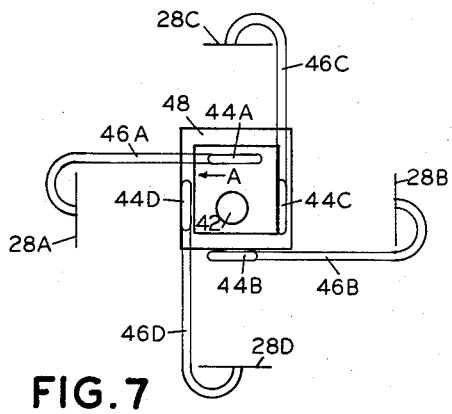
FIGURES 7 through 12 are diagrammatic views of the position of the inverted cup-slide relative to port openings as the meter passes through one complete measuring cycle.

An alternate embodiment of a means of achieving full stroking is indicated in FIGURE 3. In this arrangement the shaft 70 is not required and instead full stroking of the meter is achieved magnetically. Four permanent magnets 86 are positioned so that when a diaphragm cavity 36 is empty and thereby backing plate 32 is near the interior wall of diaphragm plate 20 (made of non-magnetic material, such as aluminum), the backing plate 32 will be magnetically attracted by magnets 86. In this manner, as a yoke 30 begins a stroke from one extreme direction to the other, energy of the fluid flow will be required to first overcome the magnetic attraction of the magnet 86 on one of the backing plates 32. As the yoke 30 moves past the midway point in its travel, it will be attracted by the opposite magnet 86 and pulled to complete its maximum stroke. Energy of the fluid is required to at first overcome one magnet 86, but as the yoke 30 completes more than one-half of its stroke, energy is supplied by the magnetic attraction of the opposite magnet 86. This magnetic attraction pulling each yoke 30 through its full stroke length accomplishes the same results as the deflection of shaft 70 and assures full stroking of the meter so that accuracy is maintained over a wide range of fluid flows and especially at very low flow rates.

An obvious alternate arrangement includes replacing backing plates 32 with magnetic materials which may be attracted by diaphragm plates 20, if of paramagnetic material, or by paramagnetic members in place of magnets 86. Additionally, backing plates 32 may be of magnetic materials having polarity arranged to attract to magnets 86 when in the proximity thereof. Another alternate embodiment includes replacing permanent magnets 86 with electromagnets. The electromagnets may be adapted to energize and attract the backing plates 32 to complete the full stroke of each yoke 30 but be deenergized at the point of reversal of stroke direction so that no energy is required of the stream flow on the first half of a yoke movement.

One means of calibrating the meter is indicated in FIGURE 4. A screw 88 threadably engages a threaded opening 90 in diaphragm plate 20. By turning the screw 88 inwardly the total maximum travel of yoke 30A is shortened, which means that the displacement of diaphragm 28A and diaphragm 28B will be reduced. By adjusting screw 88 the total quantity of fluid passing through the meter 10 on each complete cycle can be varied. Only one screw 88 may be used, or, if necessary, one may be used on each of the diaphragm plates 20 depending upon the amount of adjustment required.

This invention has been described showing the application of the use of diaphragms 28. It can be seen that pistons operable within cylinders may be substituted without changing the concepts of this invention. When the term "diaphragm" is used in this disclosure a meaning including any expansionable chamber device such as pistons or folding diaphragms is intended.

A cylinder-piston arrangement may, as mentioned, replace the diaphragm cavity-diaphragm arrangement of this disclosure. The diaphragm cavity or cylinder may be broadly termed an expansionable chamber and the diaphragm or piston may be likewise broadly termed an expansionable chamber member.

This invention provides a type of meter having highly improved accuracy, particularly at low flow rates and an improved range of accuracy to measure varying flow rates. The meter is of a design such that close tolerance machining is not required in that the only fitted surfaces are easy to achieve planed surfaces of port plate 40 and lower surface 50 of inverted cup-slide 48. The meter is compact, and may be simply made of relatively inexpensive components. The only wearing surface is that of inverted cup-slide 48 against port plate 40 which is only a relatively small circular motion insuring an extended useful life of the meter with a minimum of repairs.

One of the important novel aspects of the invention is the provision of a meter which will not suffer loss of accuracy as wear occurs in the meter. The primary wearing surface is that of inverted cup-slide 48 on port plate 40. As the inverted cup-slide wears there is no change in the measuring accuracy of the meter. The only other point of wear is that of ball 72 on shaft 70 against positioning bearing 58, or positioning bearing 58 against pin 54. The meter may be designed so that even a substantial reduction in the diameter of ball 72 or positioning bearing 58 will still provide sufficient flexing of shaft 70 to insure full stroking of the meter.

The meter of this invention utilizes no connecting members, pivots, joints, levers, cams or other devices to loosen and destroy calibration. The meter has a minimum number of parts and is self contained and therefore subject to ready design to high working pressures. The absence of linkages and the compact arrangement of components readily adapt the meter of this invention to miniaturization.

The invention has been described by way of example only and many other changes may be made in the details of construction and the arrangement of components without departing from the spirit and scope of this disclosure.

What is claimed:

1. A fluid meter, comprising, in combination: a body member having a fluid cavity adapted to receive fluid; the body member having a first and a second pair of radially disposed expansionable chambers; expansionable chamber members actuatable within said expansionable chambers whereby the volume of each of said expansionable chambers may be varied; a first yoke member extending from one of said expansionable chamber members of said first pair to the other of said expansionable chamber members of said first pair; a second yoke member extending from one of said expansionable chamber members of said second pair to the other of said expansionable chamber members of said second pair and being aligned in a plane parallel to the plane of the first yoke member and in close proximity thereto; the axes of the yoke members being disposed for reciprocation at substantially right angles with respect thereto, and each of said yoke members having an opening therein, the opening in said first yoke member overlapping said opening in said second yoke member; a port plate positioned in a plane parallel to said yokes and in near proximity thereto, said port plate having a discharge opening therein communicating with the exterior of said body member and four fluid control openings therein each having passage continuity with one of said expansionable chambers; an inverted cup slide member disposed in sliding engagement with the surface of the port plate, said inverted cup slide member extending through said overlapipng openings in said yoke members and adaptable thereby to be movably positioned on said port plate by movement of said yoke members, said inverted cup slide having a fluid cavity formed in the bottom surface thereof adaptable to permit fluid to flow from said fluid control openings into said discharge opening according to the position of said inverted cup slide member; means for insuring full reciprocal stroking movement of said yoke members, said means being adapted to extract energy from the flow of fluid through said meter on the first portion of the reciprocal movement of each of said yoke members and to return said energy to the flow of fluid through said meter on the last portion of the reciprocal movement of each of said yoke members whereby each reciprocal movement of each of said yoke members increases one of said expansionable chambers to the maximum volume thereof and decreases the other of said expansionable chambers to the minimum volume thereof; and means for detecting the number of reciprocal movements of one of said yoke members, said number of reciprocal movements being indicative of the volume of fluid flow through said meter.

2. A meter according to claim 1 wherein said means of full stroking said yoke members comprise; a paramagnetic member affixed to each end of each of said yoke members adjacent said expansionable chamber members; a magnetic member affixed to said body member in proximity to each of said paramagnetic members as said expansionable chamber member associated therewith is closed to a minimum volume condition whereby magnetic attraction tends to attract each of said expansionable chamber members to close to a minimum volume on each reciprocal movement of each of said expansionable chamber members.

3. A meter according to claim 1 wherein said means of full stroking said yoke members comprises, a flexible shaft member affixed at one end of said body member and terminating at the other end thereof adjacent said inverted cup slide member, said shaft in non-flexed condition extending substantially perpendicularly to the plane of said port plate; a ball member affixed to the end of said shaft adjacent said inverted cup slide member; a positioning element affixed to the upper surface of said inverted cup slide member adaptable to engage said ball member of said flexible shaft and to flex said shaft whereby the extent of flexing of said shaft is increased during the first portion of the reciprocal movement of said inverted cup slide and whereby the increaesd force of said shaft is applied to said inverted cup slide member and therefore said yoke member during the last portion of the reciprocal movement of said yoke members to force said yoke member to the full extent of the reciprocal movement thereof.

4. In a fluid meter having a body defining a fluid receiving cavity having an inlet, a first yoke member reciprocably actuated within said cavity and a second yoke member reciprocably actuated within said cavity and in a plane parallel with the rciprocable actuation of said first yoke member, each of said yoke members reciprocably actuated by a pair of opposed diaphragms, the axes of the parallel yoke members being disposed to reciprocate in angular relation with respect to each other, said first yoke member having an opening therein overlapping a substantially equal sized opening in said second yoke member; a flat port plate supported by said body member and having a surface exposed to said cavity, said surface of said port plate being disposed in a plane parallel with and in proximity to said overlapping yoke members, said port plate having discharge and fluid control openings therein, and an inverted cup slide member positioned within said overlapping openings of said yoke members, said cup slide member having the bottom lip surface thereof maintained in engagement with the surface of said port plate exposed to said cavity, said cup slide member being adaptable to control fluid flow to and away from said diaphragms according to its position on said port plate as fluid flows through said meter; means for insuring full stroking movement of said yoke members and thereby said diaphragms, said means comprising a paramagnetic means affixed to each of said yoke members adjacent each end thereof; and magnetic means supported by said body adjacent each of said yoke member ends whereby as said paramagnetic material means affixed to each end of each of said yoke members approaches the length of the reciprocable movement of said yoke members in each reciprocal direction thereof magnetic attraction of said paramagnetic materials and said magnetic means draw said yoke members to the full extent of their reciprocal movement.

5. In a fluid meter having a meter body defining a fluid receiving cavity having an inlet, a first yoke member reciprocably actuated within said cavity and a second yoke member reciprocably actuated within said cavity and in a plane parallel with the reciprocal actuation of said first yoke member, each of said yoke members reciprocably actuated by a pair of opposed diaphragms, the axes of the parallel yoke members being disposed to reciprocate in angular relation with respect to each other said first yoke member having an opening therein overlapping a substantially equal sized opening in said second yoke member; a flat port plate supported by said body member and having a surface exposed to said cavity, said surface of said port plate being disposed in a plane parallel with and in proximity to said overlapping yoke members, said port plate having discharge and fluid control openings therein; and an inverted cup slide member having the bottom lip surface thereof maintained in engagement with said port plate, said inverted cup slide member being adaptable to control fluid flow to and away from said diaphragms according to its position on said port plate as fluid flows through said meter; a means for insuring the full stroking movement of said yoke members and thereby said diaphragms, said means comprising a cylindrical positioning element affixed to and extending upwardly and substantially perpendicularly from the upper surface of said inverted cup slide member; and a resilient shaft affixed at one end thereof to said body and extending substantially perpendicularly to said port plate to slidably engage the circumference of said cylindrical positioning element of said inverted cup slide member whereby said shaft is deflected by said positioning element and applies a driving force to said inverted cup slide member and thereby to said yoke member in the direction of movement of the members to impel the diaphragms connected to the yoke members to their greatest lateral extent as the yoke members are reciprocated by fluid flow through the meter.

References Cited in the file of this patent
UNITED STATES PATENTS

| | | |
|---|---|---|
| 382,145 | Dick | May 1, 1888 |
| 1,676,651 | Huettig | July 10, 1928 |
| 1,911,521 | Marsh | May 30, 1933 |
| 2,356,273 | Risser | Apr. 22, 1944 |
| 2,667,784 | Batchelder | Feb. 2, 1954 |
| 2,924,682 | Winterburn | Feb. 9, 1960 |